INVENTORS.
JOHN P. GLASS
RUSSELL A. PHILIPP
BY
John F. A. Earley
ATTORNEY.

Feb. 22, 1966  J. P. GLASS ETAL  3,237,033
DAMPED SERVO MOTOR
Filed May 16, 1963  3 Sheets-Sheet 2

INVENTORS.
JOHN P. GLASS
RUSSELL A. PHILIPP
BY
John F. A. Earley
ATTORNEY.

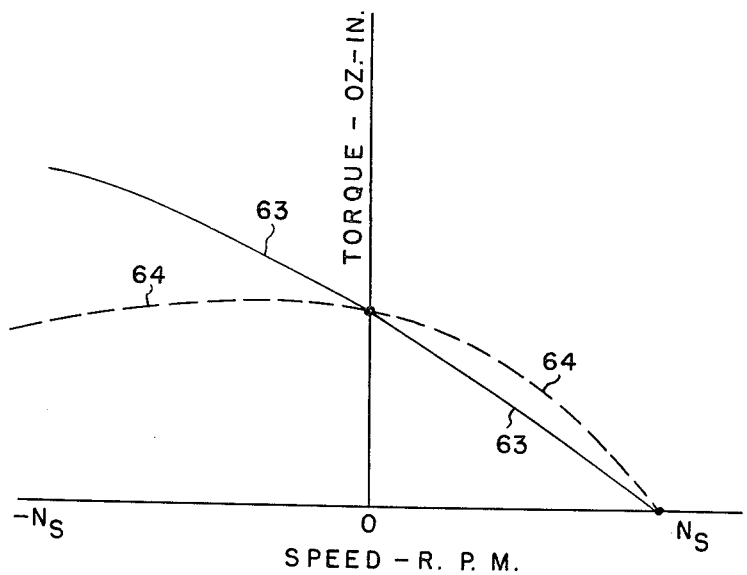
Fig. 4.
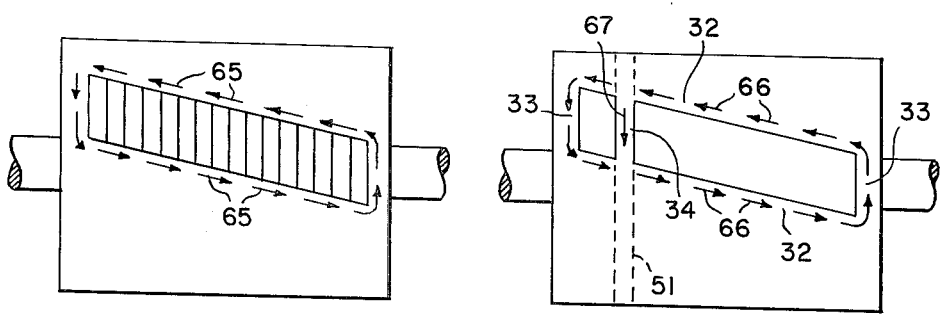
Fig. 5.
Fig. 6.

_United States Patent Office_

3,237,033
Patented Feb. 22, 1966

3,237,033
DAMPED SERVO MOTOR
John P. Glass, Ardmore, and Russell A. Philipp, Broomall, Pa., assignors, by mesne assignments, to Litton Industries, Inc., Beverly Hills, Calif., a corporation of Delaware
Filed May 16, 1963, Ser. No. 280,919
2 Claims. (Cl. 310—166)

This invention relates to an electric motor, and more particularly concerns a servo motor of high efficiency which does not "single phase" (i.e., the rotor does not continue to rotate when the control phase signal is either reduced to zero or removed while the excitation to the reference phase is continued).

It is an object of this invention to provide a servo motor of improved construction which is of high efficiency and which does not "single phase."

It is another object of this invention to provide a servo motor which does not "single phase" under any environmental conditions, such as varying temperature, to which the motor may be subjected.

It is another object of this invention to provide a servo motor which does not "single phase" when the motor is connected to any type of circuit, such as a transformer circuit, a high impedance circuit, or a tuned circuit.

It is another object of this invention to provide a servo motor in which the coast time of a servo motor (i.e., the time it takes a rotor of a servo motor to stop rotating after the signal has been turned off) is lessened, or dampened, in a novel manner. There are many other ways of reducing the dampening time of a servo motor, such as by using (a) inverse rate feedback wherein a generator provides a signal output which is fed through the amplifier of the servo system, or by using (b) viscous drag introduced by means of a magnetic force which slows the rotor as it approaches the balancing point, or by (c) introducing friction by using split gears.

Other objects and advantages of the invention, including its simplicity and economy, as well as the ease with which it may be adapted to existing equipment, will further become apparent hereinafter and in the drawings, in which:

FIG. 4 is a diagram illustrating servo motor speed-torque curves;

FIG. 5 is a view in side elevation of a conventional rotor of a servo motor illustrating the path of rotor current; and FIG. 6 is a view in side elevation of a rotor of the present invention illustrating the path of rotor current.

Figure 1:
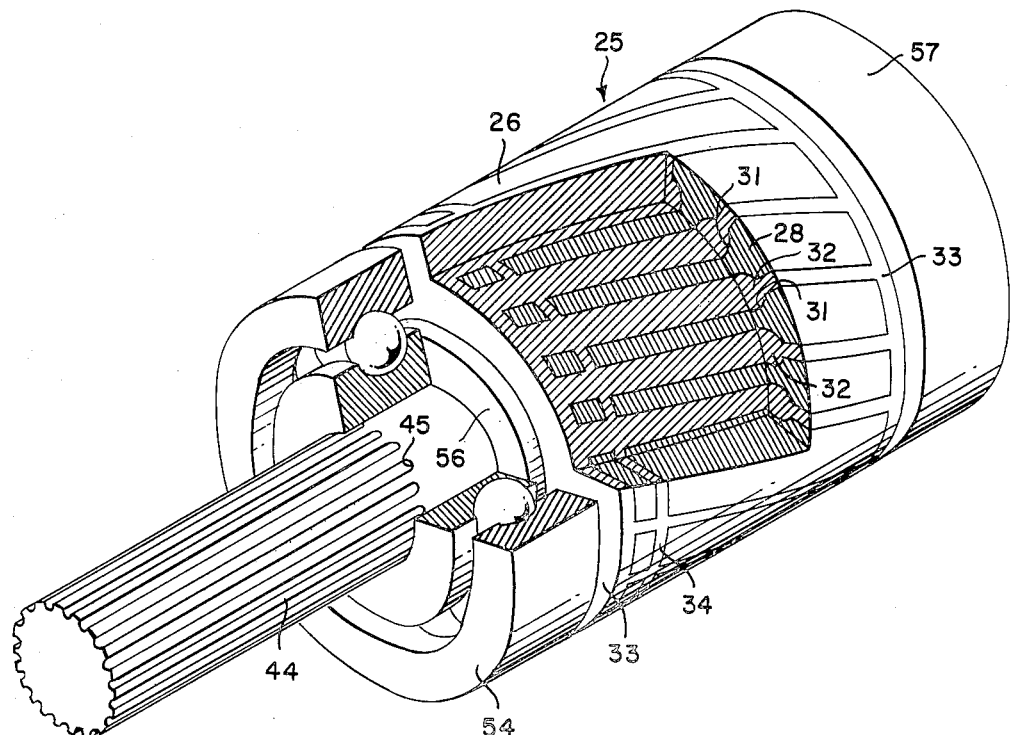
FIG. 1 is an isometric view of the rotor of a servo motor constructed in accordance with this invention.

Although specific terms are used in the following description for clarity, these terms are intended to refer only to the structure shown in the drawings and are not intended to define or limit the scope of the invention.

Figure 2:
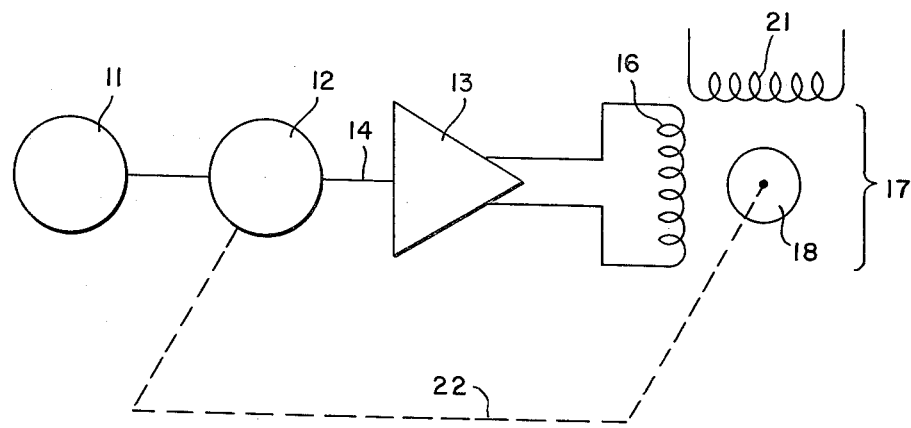
FIG. 2 is a diagrammatic view of a typical circuit which includes the servo motor.
Figure 3:
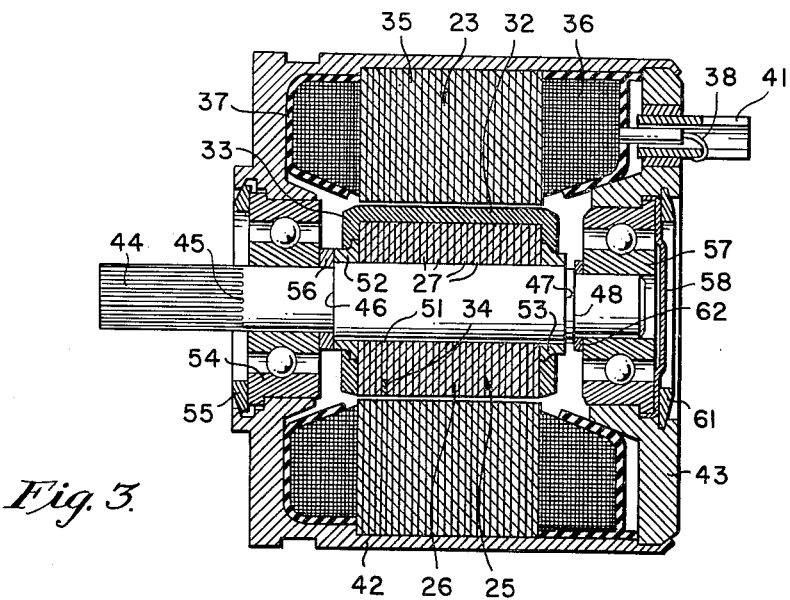
FIG. 3 is a view in section of the servo motor.

Turning now to the specific embodiment of the invention selected for illustration in the drawings, FIG. 2 shows a typical servo circuit including an information transmitter, such as a synchro transmitter 11, and an information interpreting device such as a synchro transformer 12. Information transmitters and information interpreting devices may be synchros, potentiometers, variable reluctance devices, and so forth.

Synchro transmitter 11 may be located at a computer, and be utilized to send a signal to synchro transformer 12 which may be located at a remote point. An amplifier 13 is connected to the output of transformer 12 by electrical conductors 14, and the output of amplifier 13 is connected to control phase coil 16 of a servo motor 17 which has a rotor 18 and a fixed phase coil 21. A mechanical connection 22 is made between rotor 18 and transformer 12, and it includes appropriate gearing by which the rotation or rotor 18 changes the rotor position of transformer 12. Servo motor 17 operates to zero-in the transformer 12 with respect to the signal sent out from the transmitter 11.

The problem in such a servo circuit is that, under certain conditions, servo motor 18 runs away (i.e., continues rotating) instead of stopping when transformer 12 is zeroed-in or synchronized with transmitter 11. This condition of the rotor continuing its rotation is caused by "low dampening," and the low dampening may be caused by:

(1) the load which amplifier 13 puts across control phase coil 16, (2) an open circuit in the electrical leads going to control phase coil 16, (3) temperature variations which change the electrical characteristics of rotor 18, or (4) higher efficiency of the servo motor such that it approaches the operation of a low damped induction motor, such as a conventional single phase induction motor.

In many induction motors for power service, a capacitor is connected across the control coil in order to provide for starting the motor. Once the induction motor is started, the capacitor is cut out by a centrifugal switch and the motor runs single phase. The efficiency of these induction motors is normally 50 to 90 percent, whereas the efficiency of a servo motor is normally around 6 to 12 percent. However, with the servo motor of the present invention, efficiencies of about 15 to 18 percent are obtainable without the undesirable characteristic of low dampening.

It is important to prevent servo motors from running away, i.e., continuing to rotate, if the temperature should change. Servo motors may very well be used in aircraft, and as the aircraft climbs higher, the temperature becomes colder. If the cold temperature is going to cause the servo motor to run away, the computer system is not going to work as far as any information that that particular servo motor is supposed to handle.

A conventional approach to solving the problems of "low dampening" has been to increase dampening by redesigning the amplifier. However, this approach has its attendant disadvantages, and the present invention provides a solution which does not change the amplifier at all.

Another conventional approach to the solution of this problem of "low dampening" has been to increase dampening by increasing the electrical resistance of the rotor. By making the slots of the rotor narrower, the cross sectional area of the conductors which lie in those slots is decreased and the electrical resistance of those conductors is thereby increased. However, this solution of the problem results in a decrease in the efficiency of the motor. By means of the present invention, the "low dampening" problem is solved by introducing parasitic losses into the rotor and still maintaining a highly efficient motor.

Increased dampening can also be achieved by the use of inverse-rate generators which are connected so as to oppose the motion of the rotor when it approaches a balanced position. The disadvantage here is that another component is needed, thereby increasing the weight and space required. The motor described herein does not add any extra weight or use any extra space and yet performs the same function.

The servo motor constructed in accordance with this invention includes a stator 23, and a rotor 25 having a stack 26 of ferromagnetic laminations 27 with peripheral teeth 28 separated by slots 31. Slot conductors 32 are positioned within rotor slots 31, and end conductors 33 are positioned across the ends of rotor stack 26. Another conductor 34 is shorted across the slot conductors 32 which lie in adjacent slots 31.

Stator 23 comprises a stack 35 of ferromagnetic laminations with inwardly directed teeth separated by slots, stator winding 36 positioned in the stator slots and across the ends of the stator stack 35, stator winding insulation 37, and stator winding leads 38 which are soldered to terminals 41. Stator 23 is mounted in a cup-shaped housing 42 which has its open end closed by an end plate 43.

Rotor 25 includes a shaft 44 having shoulders 45–48. An interior rotor lamination 51 is provided with a smaller diameter than the laminations 27 so that the smaller diameter lamination 51 leaves a gap between adjacent rotor slots 31 in which conductor 34 is positioned to connect together the slot conductors 32 that line in adjacent slots.

Rotor laminations 27 are held together in the assembly operation by collars 52 and 53, and the rotor conductrs are preferably made of aluminum which is centrifugally cast onto the rotor stack and into the slots between the lamination teeth. Of course, the conductors may be formed on the rotor by other means, such as by pressure molding, or by cold casting.

The rotor shaft 44 is rotatably supported at one end by a ball bearing assembly 54 held in place by a retaining ring 55. A shim 56 is positioned between ball bearing assembly 54 and collar 52.

The other end of rotor shaft 44 is rotatably supported by a ball bearing assembly 57 covered by a dust washer 58 and held in place by a retainer ring 61. A shim 62 is positioned between ball bearing assembly 57 and shaft shoulder 48.

Washers or laminations 51 may be of stainless steel or of other material. However, they are preferably made of the same ferromagnetic materials as the laminations 27, so that they have the same coefficient of thermal expansion and contraction and respond in the same manner under various temperature conditions.

Referring now to FIG. 4, which shows speed-torque curves of servo motors (with $N_s$ being synchronous speed and $-N_s$ being synchronous speed in the reverse direction), a well designed servo motor has a speed-torque curve which is flat, such as curve 63. With a flat speed-torque curve, when (for example) 10 volts are placed across the control phase coil of the servo motor, the servo rotor is rotated at a certain speed. If twice that voltage, i.e., 20 volts, are placed across the control phase coil, the servo rotor is rotated at twice the 10 volt speed. Similarly, if 30 volts are placed across the control phase coil, the servo rotor is rotated at three times the 10 volt speed. This is good servo motor design.

However, if the circuit leading to the control phase coil is a tuned circuit (so as to give higher power transfer), or if it is a high impedance circuit, the speed torque curve is bowed, such as curve 64. This is poor design because the speed response to increasing voltage across the control phase coil is not linear, and the motor is lightly damped and is likely to run away or overshoot its balancing position.

It has been found that the servo motor constructed in accordance with the present invention gives a more linear speed response to varying voltages across the control phase coil. The construction of this servo motor tends to flatten the speed-torque curve even under conditions where the circuit feeding the control phase coil may be tuned, or may be a high impedance circuit, or both.

FIG. 5 illustrates a conventional rotor of a servo motor. In FIG. 5, arrows 65 illustrate the path of the rotor current, which flows upwardly at the right end through the end conductors, to the left through a slot conductor, downwardly through the end conductors at the other end, and then to the right through another slot conductor to the starting point.

FIG. 6 illustrates the path of rotor current flow through a rotor constructed in accordance with the present invention. Starting at the bottom right, arrows 66 (indicating rotor current) pass upwardly through end conductors 33, toward the left through slot conductors, downwardly through end conductors 33 at the other end of the stack, and then toward the right through another slot to return to the starting point. However, a portion of that current, illustrated by the arrow 67, passes downwardly through rotor conductor 34, which may be an aluminum fin extending between adjacent slots. Accordingly, two rotors have been created, one to the right of conductor 34 and one to the left of conductor 34, and one of them counteracts the effect of the other to provide a braking effect on the entire rotor against "single phasing." By placing washer or lamination 51 toward one end of the rotor shaft, the smaller rotor created thereby has a small braking effect on the larger rotor. Accordingly, to increase the braking effect on the larger rotor, the washer 51 may be moved toward the middle of the rotor stack.

The braking effect may also be varied by increasing or decreasing the diameter of washer 51, thereby increasing or decreasing the cross section of the rotor conductor 34 between adjacent slots.

Also, to increase the braking effect, a number of washers 51 may be used. In practice, it has been found that at higher frequencies, such as 800 to 1000 cycles per second, or with high speed servo motors (such as with four pole motors), low dampening is more pronounced and is more of a problem. Accordingly, in such motors, satisfactory results have been obtained by using two washers 51, one near each end of the rotor stack about three or four laminations inwardly from the ends of the stack.

Another advantage of the present invention is that it lessens the coast time of a servo motor, that is, it shortens the time required for the rotating rotor to come to a halt after the power to the control phase coil has been shut off by the operator or by a fault (for example, if the line leading to the control phase coil has been opened). This lessened coast time is desirable, since when the apparatus is again started, the rotor has less servoing to do initially to come into synchronism.

Normally, servo motors have six poles, and by cutting off all the teeth of one lamination 51, we thereby, in effect, create a six-pole brake against running away. However, under some circumstances, a one-pole brake may be sufficient, and this may be created by cutting off a lesser number of teeth of lamination 51, such as one, two, or three teeth.

It is to be understood that the form of the invention herewith shown and described is to be taken as a presently preferred embodiment. Various changes may be made in the shape, size and arrangement of parts. For example, equivalent elements may be substituted for those illustrated and described herein (the smaller-diameter interior lamination 51 may be a shim or washer instead of a lamination with its teeth cut off), parts may be reversed, and certain features of the invention may be utilized independently of the use of other features, all without departing from the spirit or scope of the invention as defined in the subjoined claims.

The claimed invention:

1. A servo motor having high dampening comprising a cup-shaped housing having an open end closed by an end plate, a stator positioned in said housing and having a stack of ferromagnetic laminations with inwardly directed teeth separated by slots, a stator winding positioned in the stator slots and across the ends of the stator stack, insulation covering the ends of the stator winding, terminals mounted on the end plate, stator winding leads connecting the stator winding to the terminals, a rotor having a stack of ferro-magnetic laminations including end laminations and interior laminations between them mounted on a rotor shaft, said rotor laminations having peripheral teeth separated by slots, aluminum conductors positioned in the rotor slots and across the ends of the rotor stack, one of the interior laminations in the rotor stack having a smaller diameter than the other laminations so that the smaller diameter lamination leaves a gap between adjacent slots, a conductor positioned in said gap to connect together the slot conductors in adjacent slots, said rotor being positioned in said stator, and bearing assembly means rotatably supporting the rotor shaft in the housing and preventing axial movement of the rotor relative to the stator.

2. A servo motor which has high rotational dampening, comprising a stator, a rotor having a stack of ferromagnetic laminations with peripheral teeth separated by slots, conductors positioned in said slots to form slot conductors and across the ends of the rotor stack to form end conductors, and a short-circuiting conductor connecting between slot conductors, said short-circuiting conductor being thinner than the end conductors and extending radially no farther than the slot conductors and positioned adjacent an end conductor.

References Cited by the Examiner
UNITED STATES PATENTS

| | | | |
|---|---|---|---|
| 1,717,289 | 6/1929 | Weiler | 310—183 X |
| 2,869,008 | 1/1959 | Carlsen | 310—211 X |

ORIS L. RADER, *Primary Examiner.*

MILTON O. HIRSHFIELD, *Examiner.*